No. 841,697. PATENTED JAN. 22, 1907.
W. LAUTENSCHLÄGER.
APPARATUS FOR TRUCKS OF RAILWAY CARRIAGES.
APPLICATION FILED OCT. 19, 1906.

2 SHEETS—SHEET 1.

No. 841,697. PATENTED JAN. 22, 1907.
W. LAUTENSCHLÄGER.
APPARATUS FOR TRUCKS OF RAILWAY CARRIAGES.
APPLICATION FILED OCT. 19, 1906.

2 SHEETS—SHEET 2.

UNITED STATES PATENT OFFICE.

WILHELM LAUTENSCHLÄGER, OF PINEROLO, NEAR TURIN, ITALY.

APPARATUS FOR TRUCKS OF RAILWAY-CARRIAGES.

No. 841,697.     Specification of Letters Patent.     Patented Jan. 22, 1907.

Application filed October 19, 1906. Serial No. 339,709.

*To all whom it may concern:*

Be it known that I, WILHELM LAUTENSCHLÄGER, of Pinerolo, near Turin, Italy, have invented certain new and useful Improvements in Pull-Back Apparatus for Trucks of Railway-Carriages or the Wheels of Automobiles, of which the following, taken in connection with the accompanying drawings, is a full, clear, and exact description.

My invention chiefly relates to shifting and swiveling trucks for railway-carriages; and the object is to provide a simple and efficient means for bringing back the truck or bogie to its central position after it has been displaced.

The invention consists in fitting the truck or bogie with arms rotating about pins on the truck or bogie and connected by a spring so as to draw their ends together, checks for the other ends of the arms being provided at the truck or bogie and the car-body in such a manner that when the truck or bogie is in its central position every lever is in contact with one check on the car-body and the neighboring check on the truck or bogie frame.

I desire it to be understood that the invention is not to be limited to railway or tramway carriages, but that it may also be applied to the swiveling wheels of street-carriages, such as automobiles or the like.

Figure 1:
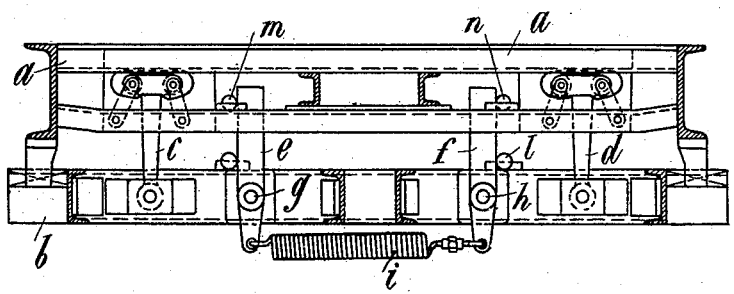
Figure 2:
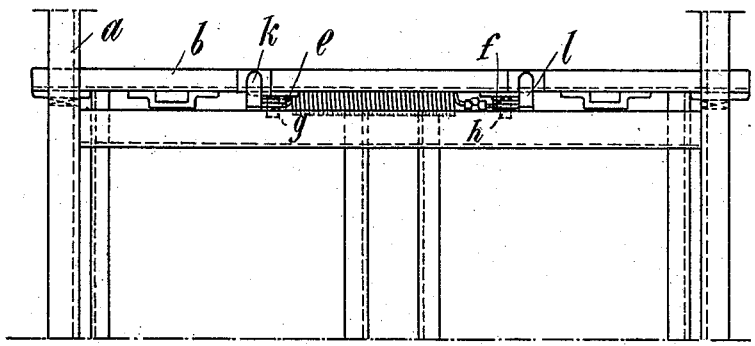
Figure 3:
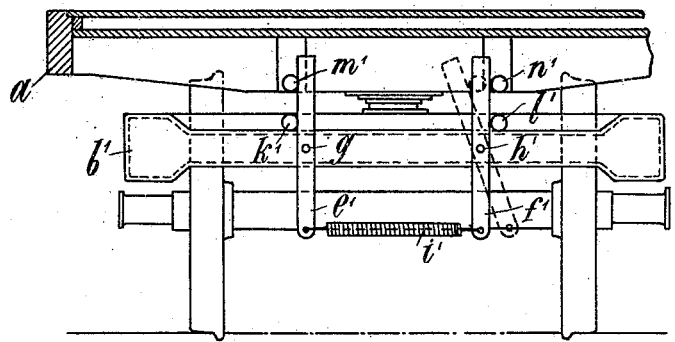
Figure 4:
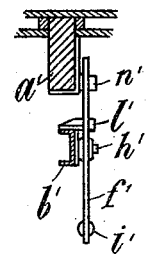

In the drawings accompanying this specification and forming a part thereof, Figure 1 is a front end view of a shifting truck fitted with the invention. Fig. 2 is a plan view of the same. Fig. 3 is a front end view of a swiveling truck or bogie. Fig. 4 is a side elevation of part of the bogie shown in Fig. 3, and Fig. 5 is a plan view of Fig. 3.

Referring to the drawings, in Figs. 1 and 2, $a$ is the car-body. $b$ is the frame of the shifting truck. $c$ and $d$ are arms for carrying the car-body on the truck. At a convenient part of the truck-frame, preferably on its frontal girder, two double-armed levers $e$ and $f$ are arranged to rotate about pins $g$ and $h$. A spring $i$ connects two arms of the levers. This spring is fastened with some tension, so as to draw the ends of the arms together when they are free to rotate. On the frame $b$ checks $k$ and $l$ are arranged for each of the free arms of the levers $a$ and $f$. Similar checks $m$ and $n$ are arranged on the car-body $a$ in such a manner that in the central position of the truck the levers $e$ and $f$ are by the tension of the spring $i$ pressed against both checks $k$ and $m$ and $l$ and $n$.

Figure 5:
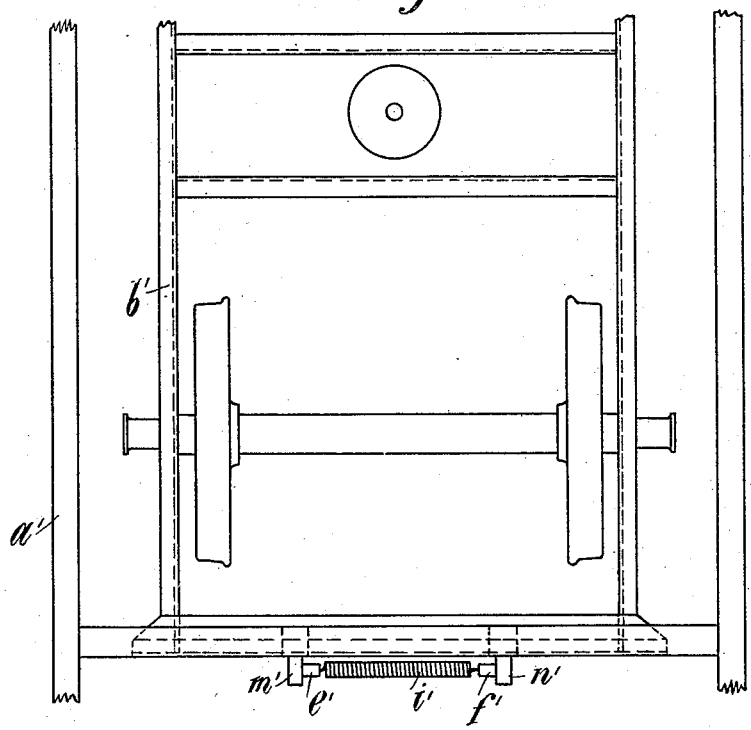

Figs. 3, 4, and 5 show the arrangement of the invention on a swiveling bogie. $a'$ is the car-body; $b'$, the bogie-frame. $c'$ is the center pin. $e'$ and $f'$ are the two-armed levers. $i$ is the pull-pack spring, and $k'$, $l'$, $m'$, and $n'$ are the checks on the truck-frame $b'$ or the car-body $a'$, respectively.

When the carriage runs through a curve, the truck or bogie is displaced from its central position—for instance, to the right in Fig. 3. The check $n'$ is then displaced to the left with relation to the truck or bogie and lifts the lever $f'$ from its check $l'$, as shown in dotted lines in Fig. 3, at the same time straining the spring $i$. The lever $e'$ cannot leave its position, as it is held by the pin $g'$ and the check $k'$. So although it leaves the check $m'$ it is not influenced by the swiveling or shifting of the truck or bogie, but only pressed the tighter against the check $k'$ the more the spring $i'$ is strained. When the carriage has left the curve, the spring $i$ pulls the lever $f'$ back to its original position until it is in positive contact with both the checks $n'$ and $l'$.

I do not wish to be limited to the precise or exact form of construction shown, as said construction may be changed in various ways without departing from my invention.

What I claim as new, and desire to secure by Letters Patent, is—

1. The combination with a truck or bogie for railway-carriages and the like of arms arranged to rotate on the frame of said truck or bogie, checks on the frame of said truck or bogie within the throw of said arms, and means for keeping said arms in positive contact with said checks.

2. The combination with a truck or bogie for railway-carriages and the like of arms arranged to rotate on the frame of said truck or bogie, checks on the frame of said truck or bogie within the throw of said arms, checks on the car-body and means for keeping said arms in positive contact with both the checks on the truck or bogie frame and the car-body.

3. The combination with a truck or bogie for railway-carriages and the like of arms arranged to rotate on the frame of said truck or bogie, checks on the frame of said truck or bogie within the throw of said arms, checks on the car-body and a coiled spring for keeping said arms in positive contact with both the checks on the truck or bogie frame and the car-body.

In witness whereof I have hereunto signed my name, in the presence of two subscribing witnesses, this 8th day of October, 1906.

WILHELM LAUTENSCHLÄGER.

Witnesses:
GOTTARDO C. PINNI,
LOUIS ALLAN.